Patented Nov. 16, 1937

2,098,976

UNITED STATES PATENT OFFICE 2,098,976

MEDICINAL PREPARATIONS CONTAINING METAL COMPOUNDS OF DECOMPOSITION PRODUCTS OF NUCLEOPROTEINS

Simon L. Ruskin, New York, N. Y., assignor to Frances R. Ruskin, New York, N. Y.

No Drawing. Application November 2, 1933, Serial No. 696,390

8 Claims. (Cl. 167—68)

This invention relates to medicinal preparations and more particularly to preparations which contain non-alkali metal compounds of decomposition products of nucleoproteins, such as their organic hydrolytic decomposition products, which contain a pyrimidine ring in their molecule. The present application is a continuation in part of my copending applications Serial #648,993, filed December 27, 1932; and Serial #650,137, filed January 4, 1933.

One object of this invention is to provide a preparation adapted for administration in human or veterinary metal salt therapy which consists of isotonic solutions of metal compounds of decomposition products of nucleoproteins, particularly their organic hydrolytic decomposition products, which contain a pyrimidine ring in their molecule, such as the isolated mononucleotides, the nucleosides and the purine and pyrimidine bases derived therefrom.

This and other objects of this invention will become evident from the following examples and the claims annexed hereto.

Example 1

Salve containing mercury adenylate (the mercury compound of the isolated nucleotide adenylic acid) and lanolin. 30 grams of mercury adenylate are thoroughly mixed with 70 grams of lanolin so as to form a salve which is of excellent antiseptic properties and is much more easily resorbed by the skin than, for instance, a usual mercury salve.

Isotonic solutions of mercury adenylate for instance are excellent agents for the treatment of syphilis. They do not at all irritate the tissue on intramuscular or subcutaneous application and do not cause pain since they have no protein-precipitating effects. They are eliminated very slowly, a property which is of great value. Its aqueous solutions which are preferably obtained by the addition of common salt do not attack metals so that they may fully replace sublimate and the like compounds, for sterilizing surgical instruments.

Example 2

Tablets of calcium salts of a mixture of adenylic and guanylic acid, which, as is known, are purine nucleotides, as distinguished from the pyrimidine nucleotides, uridylic and cytidilic acids, all of these nucleotides, however, containing the pyrimidine ring. 10 grams of the calcium salts and 10 grams of sugar are thoroughly mixed and pressed to tablets after the addition of about 2% of tragacanth and a little water as binder. These tablets are applied per os. They represent very valuable preparations for the introduction of calcium and phosphoric acid into the human body in cases of rickets and the like diseases.

The calcium nucleotides, and likewise the other nucleotides mentioned herein, may be prepared by double decomposition, as by reacting an alkali metal nucleotide, including ammonium nucleotide, with an inorganic salt of the metal whose nucleotide is to be produced, the latter being precipitated with or without the aid of sodium hydroxide, as disclosed in my copending application Serial No. 696,388, filed simultaneously herewith.

Instead of the mentioned compounds, also other metal compounds of the decomposition products of nucleoproteins, and particularly their organic hydrolytic decomposition products, which contain a pyrimidine ring may be used. For instance, silver nucleotides, that is, the silver compounds of the isolated nucleotides, may be employed in the form of 1 to 2% solutions in water for the treatment of gonorrhea. Such a solution or other silver nucleotide preparation has a much higher antiseptic value than the known preparations, while on the other hand they do not affect the mucous membranes and tissues. Isotonic solutions are very suitable for intravenous injections in cases of general sepsis and the like.

Iron nucleotides are used, for instance, in the form of tablets or of aqueous solutions as tonics. Their application has the great advantage that the intestinal tract is not at all affected while all of the known iron preparations have a more or less deleterious effect.

Gold nucleotides, for instance, in the form of diluted isotonic solutions are used intravenously for the treatment of tuberculosis and surpass all the known gold preparations, with respect to its good compatibility.

Aluminum nucleotides and the like in aqueous solutions or when mixed with talcum in the form of powders are also far superior to any other known aluminum preparation and act as an antiseptic as well as an astringent agent which is non-irritating. It is especially suitable in the form of aqueous solutions for the dressing of wounds which have already become gangrenous and septic.

Bismuth nucleotides and the like are used with advantage as powders for the treatment of wounds and the like. In the form of tablets, they represent an intestinal disinfectant which surpasses all the known bismuth compounds by their stability against the hydrochloric acid of the stomach.

Likewise the isolated nucleotides of other metals employed in metal salt therapy surpass to a marked extent the corresponding, hitherto used metal compounds considerably in their better compatibilty and their less deleterious effect upon the tissues.

It is understood that the invention is not limited to the specific examples given heretofore, and said examples merely illustrate the many forms of the present invention. Various changes may be made by those skilled in the art in accordance with the principles set forth herein and in the claims appended hereto.

What I claim is:

1. A medicinal preparation for the treatment of diseases by application to the human or animal body comprising an adenylate of calcium.

2. A medicinal preparation for the treatment of diseases by application to the human or animal body comprising an adenylate of mercury.

3. A medicinal preparation for the treatment of diseases by application to the human or animal body comprising the calcium compound of isolated purine nucleotides, substantially free from pyrimidine nucleotides.

4. A medicinal preparation for the treatment of diseases by application to the human or animal body comprising an isolated nucleotide of a metal of the group consisting of mercury, calcium, iron, gold, silver and aluminum.

5. A medicinal preparation for the treatment of diseases by application to the human or animal body comprising a mercury compound of an isolated purine nucleotide.

6. A medicinal preparation for the treatment of diseases by application to the human or animal body comprising a calcium compound of an isolated purine nucleotide.

7. A medicinal preparation for the treatment of diseases by application to the human or animal body comprising a compound of a metal of the group consisting of mercury, calcium, iron, gold, silver and aluminum, and two isolated nucleotides having the same nuclear structure.

8. A medicinal preparation for the treatment of diseases by application to the human or animal body by injection comprising an isotonic solution of a compound of an isolated nucleotide and a metal of the group consisting of mercury, calcium, iron, gold, silver and aluminum.

SIMON L. RUSKIN.